No. 848,394. PATENTED MAR. 26, 1907.

G. H. POOR.
SHELL WINDING MACHINE.
APPLICATION FILED APR. 30, 1904.

Witnesses: Inventor:
Geo. H. Poor,
By Paul Synnestvedt
Att'y

No. 848,394. PATENTED MAR. 26, 1907.
G. H. POOR.
SHELL WINDING MACHINE.
APPLICATION FILED APR. 30, 1904.

Witnesses:
Geo. E. Gaylord
Chas. H. Ebert

Inventor,
George H. Poor,
By Paul Synnestvedt
Atty

No. 848,394. PATENTED MAR. 26, 1907.
G. H. POOR.
SHELL WINDING MACHINE.
APPLICATION FILED APR. 30, 1904.

Witnesses:
Inventor:
George H. Poor,
By Paul Synnestvedt

No. 848,394. PATENTED MAR. 26, 1907.
G. H. POOR.
SHELL WINDING MACHINE.
APPLICATION FILED APR. 30, 1904.

Witnesses:
Chas E Gaylord.
Chas. H. Eberh

Inventor
George H. Poor,
By Paul Synnestvedt
Atty

UNITED STATES PATENT OFFICE.

GEORGE H. POOR, OF CHICAGO, ILLINOIS, ASSIGNOR, BY MESNE ASSIGNMENTS, TO RAYMOND CONCRETE PILE COMPANY, OF CHICAGO, ILLINOIS, A CORPORATION OF NEW JERSEY.

SHELL-WINDING MACHINE.

No. 848,394.       Specification of Letters Patent.       Patented March 26, 1907.

Application filed April 30, 1904. Serial No. 205,740.

*To all whom it may concern:*

Be it known that I, GEORGE H. POOR, a citizen of the United States, residing at Chicago, in the State of Illinois, have invented certain new and useful Improvements in Shell-Winding Machines, of which the following is a specification.

My invention relates to machines for winding built-up tubes or shells of paper or other pliable sheet material, such as are employed for example in the making of concrete piling. The objects of the invention are, to provide continuously operating mechanism for winding and pasting sheets of paper cumulatively and compressing them together, and varying the pressure as desired; to provide improved means for varying the position of the winding roll upon the pressing roll or to lift it out of contact with both rolls as desired, and convenient mechanism for raising the roll in position for removal of the completed shell therefrom; to provide superior means for adjusting and feeding the sheets through the rolls, and for trimming the shells, and to generally improve the structure and operation of such machines. I attain these various objects and other advantages which will be hereinafter set forth by means of the construction and assemblage of parts as shown for illustration in a preferred type of machine illustrated in the accompanying drawings, wherein—

Figures 17ª, 17ᵇ, are enlarged partial sections of the top or winding roll in Figure 17, showing two methods of attaching the paper thereon;

Figure 1:
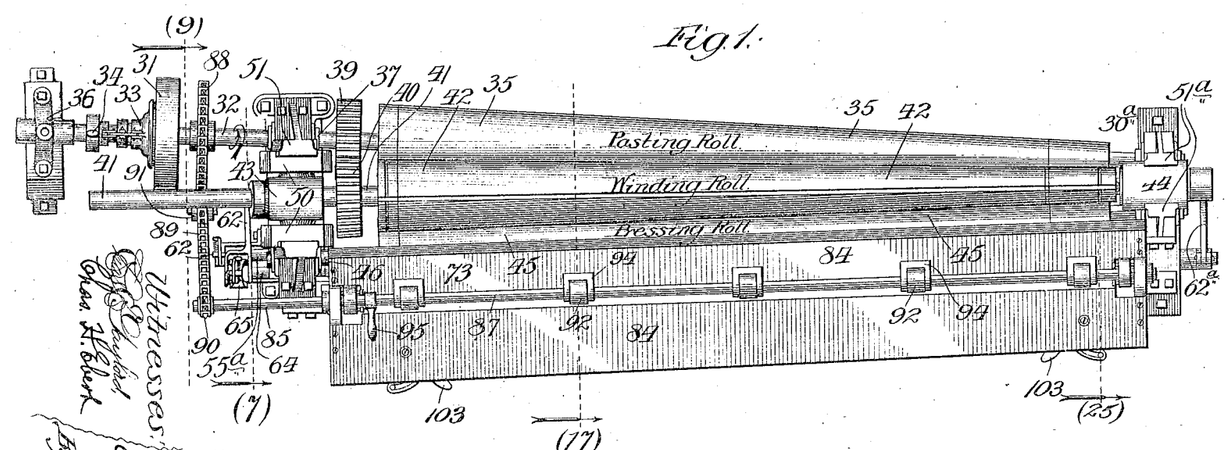
Figure 1 is a top plan view of the complete machine.
Figure 2:
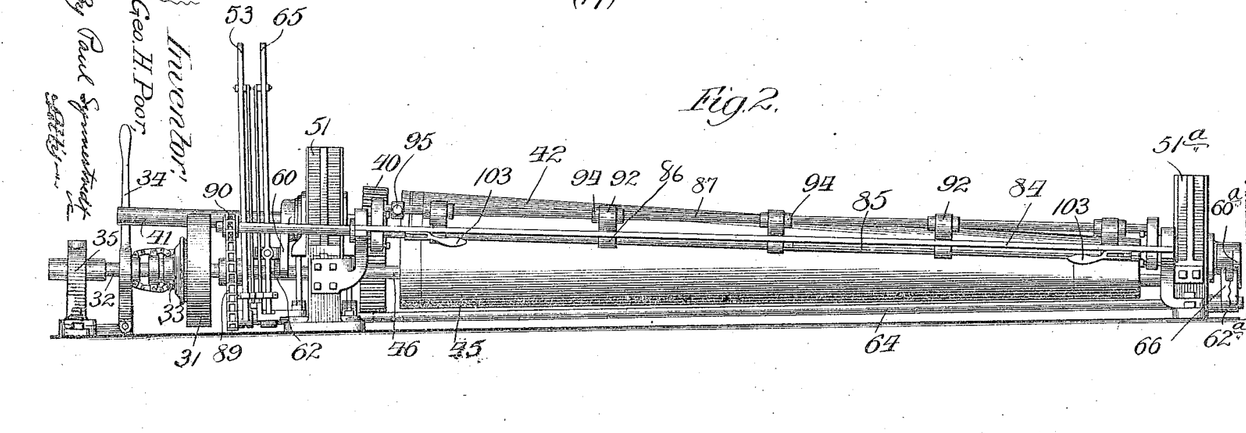
Figure 2 is a side elevation of the same.
Figures 3, 4:
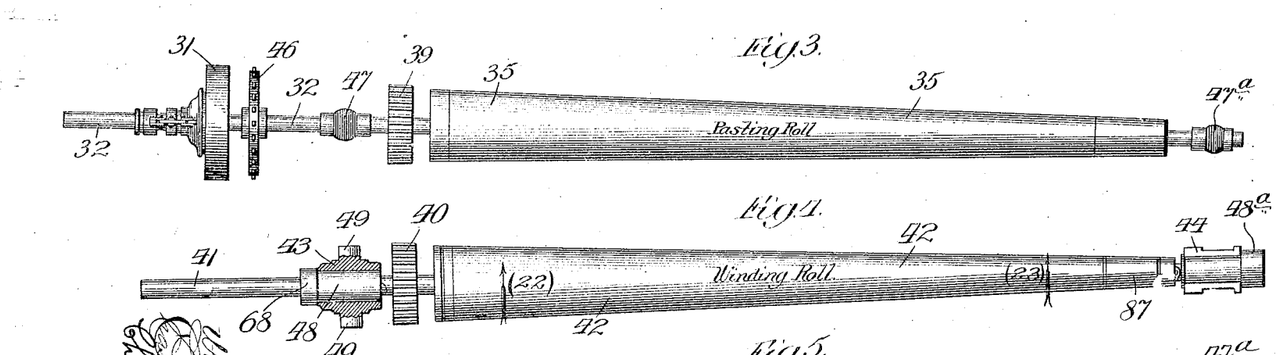
Figures 3, 4, and 5, are plan views of the three rolls constituting the principal members of the machine, shown separate from their connecting parts.
Figure 5:
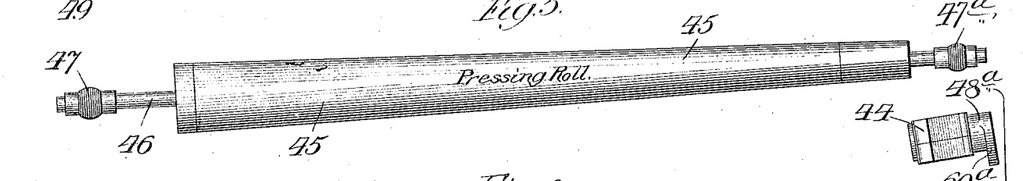

The machine consists essentially of the three rolls shown in Figures 3, 4, and 5, and the mechanism for operating them. One is for winding the paper thereon, one for supplying its surface with a binding material, and the other for pressing the layers together, and the three rolls in operation are arranged in position as shown by the cross section of Figure 17. Referring first to Figures 1 and 2 especially, it will be seen that at the two ends of the base of the machine I have provided uprights 30 and 30$^a$ in which are mounted the bearings of the shafts of the rollers. The pasting roll at the rear of the machine is preferably the one directly turned by power, which may be applied by belt to the pulley 31 mounted upon the shaft 32 of the pasting roll 35. This shaft has an outside pivoted bearing in a bracket 36, and a horizontally adjustable bearing in block 37 (Figure 7) passing through the bracket 30 and at the farther end a bearing 38 in upright 30$^a$. The shaft 32 is provided with a gear 39 which co-operates with the gear 40 upon the shaft 41 of the winding roll 42, this shaft having eccentric bearing in blocks 43 and 44 in vertical guides 51 and 51$^a$ at its respective ends, and driving the presser roll 45 by its weight and friction therewith, the shaft 46 of the roll 45 having suitable bearings in the two end brackets similar to those of roll 35. The pulley 31 is preferably the loose half of a friction gear of which the other portion is the clutch 33 operated to engage and turn the shaft when desired, by means of the lever 34 as is ordinary in such constructions.

Figure 6:
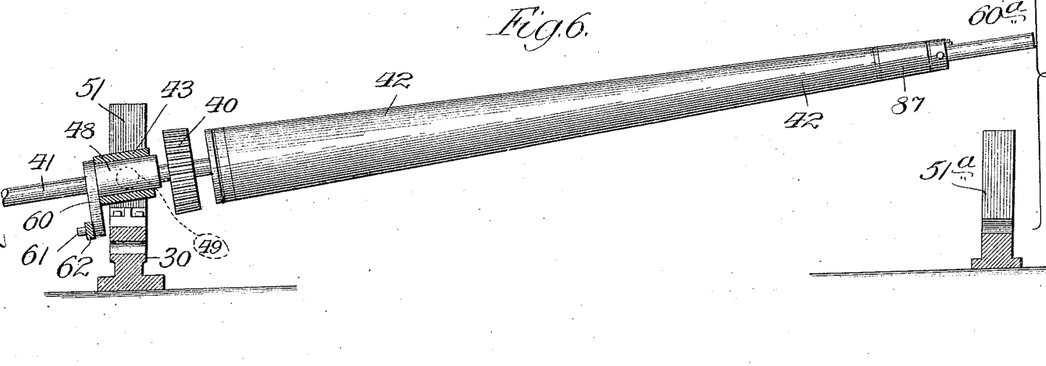
Figure 6 is a side elevation of the winding roll shown as held in elevated position in order to remove the finished shell therefrom.
Figure 7:
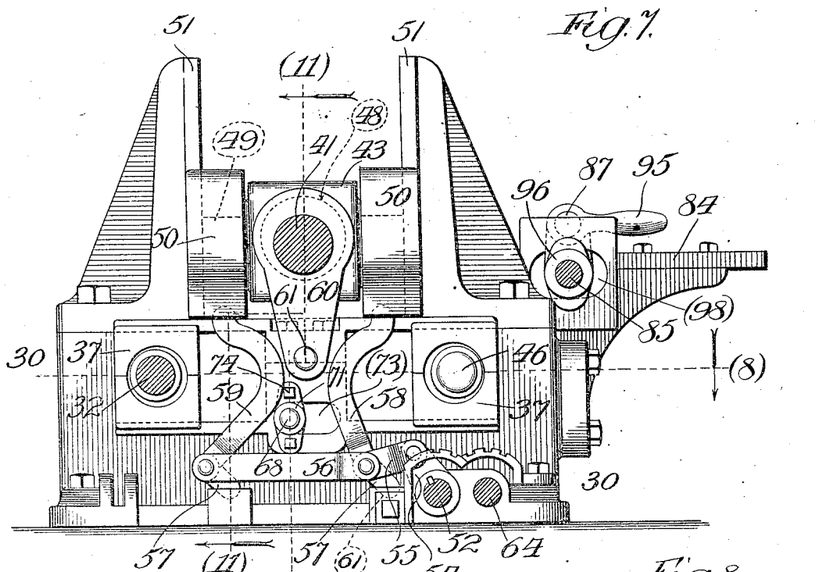
Figure 7 is an enlarged view in end elevation, and section of some of the shafts, the view being taken along the line (7) in Figure 1, and looking to the right therein.
Figure 8:
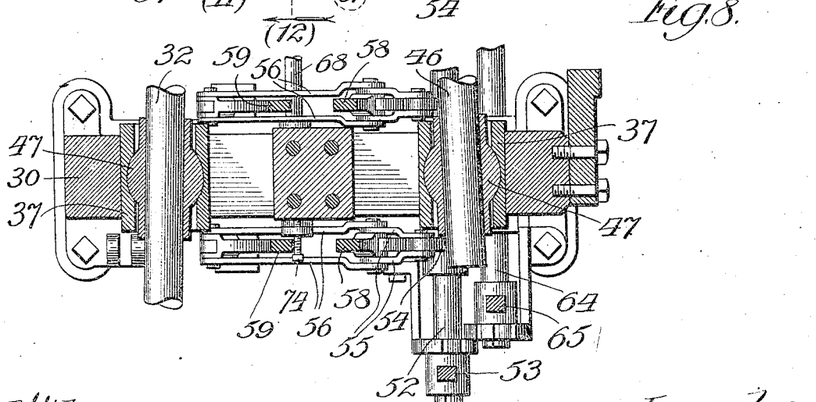
Figure 8 is a plan view and section on line (8) in Figure 7.
Figure 11:
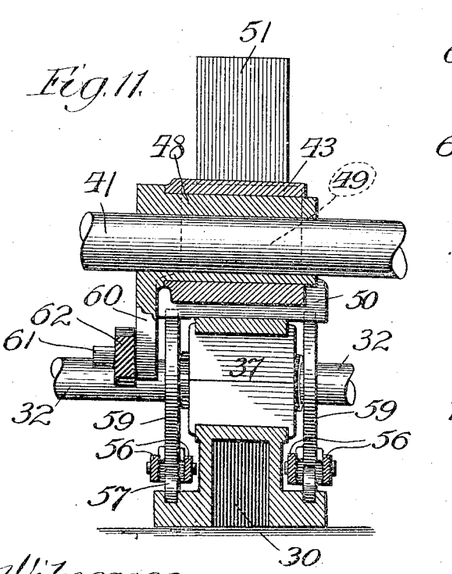
Figure 11 is a broken vertical section of the end bearing mechanism taken along the line (11)-(11) in Figure 7.

The three rolls are preferably made in tapering form as shown, and the two stationary rolls 35 and 45 are provided with spherical bearings 47 in the blocks 37 as shown in Figures 3 and 5, and in section in Figure 8. Referring especially to Figures 6, 7, and 11, it will be seen that the winding roll 42 is mounted at its large end in an eccentric bearing sleeve 48 in the block 43 and the latter is provided with trunnions 49 which are pivoted in the notched blocks 50 which set within the upright guides 51 upon the top of uprights 30, whereby the bearing may be raised or lowered, and the roll may be turned upon the bearing trunnions so as to take the position shown in Figure 6, in order to remove the finished shell therefrom. In order to raise and lower the entire roll when desired, I provide upon the rock shaft 52, which is operated by means of the handle 53, (Figures 2 and 8), a crank 54 fixed securely thereto, which by means of links 55 and 56 is connected to the toggle levers 57 and bars 58 and 59. These are fulcrumed at the base and engage the two blocks 50 and raise them vertically in the guide-ways 51 as will be evident from the drawings.

Figure 9:
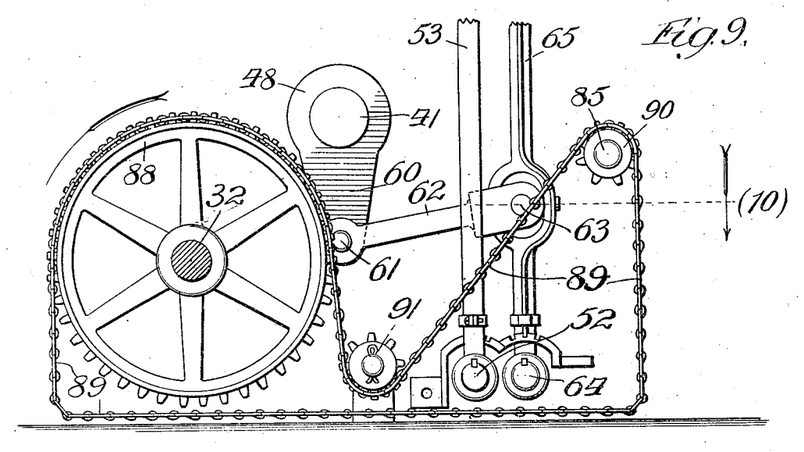
Figure 9 is another end elevation, taken from the line (9) in Figure 1, and looking to the right therein.
Figure 10:
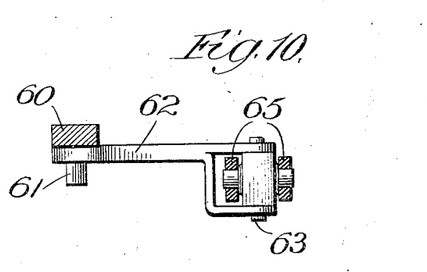
Figure 10 is a detail section on line (10) in Figure 9.
Figures 14, 15, 16:
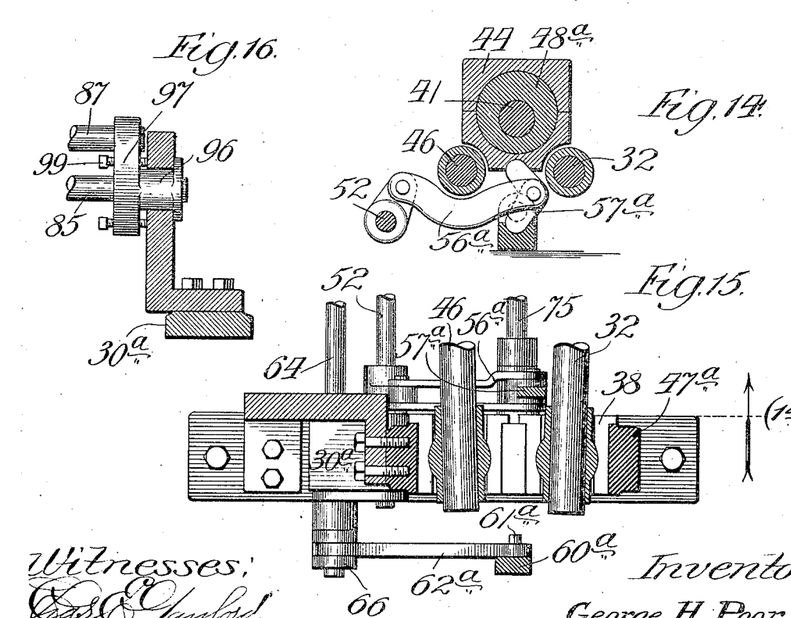
Figure 14 is a partial vertical section behind the guides 51ª, taken on the line (14) in Figure 15, showing the means for raising the bearing block of the winding roll.
Figure 15 is a partial horizontal section and plan of the mechanism at the right end of the roll bearings, the section being along the line (15) in Figure 13.
Figure 16 is a partial vertical section taken along the line (16) in Figure 13, showing the mounting of the end bearing of the feed roll.

The eccentric mounting of the bearing 48 in the blocks 43 is for the purpose of thrusting the winding roll 42 toward either the pressing roll or pasting roll as desired, and adjusting it nicely for its purposes. It will be seen from Figures 11 and 9 particularly that this adjustment is made by means of the depending crank arm 60 having a pin 61 which engages the link 62 pivoted universally at 63 and moved by means of a lever 65 on shaft 64, as shown in Figures 9 and 10. The universal pivoting of the link 62 allows for the two motions of the shaft 41. By reference to Figures 15 and 14 it will be seen that at the far end of the shaft 41 it is similarly provided with a crank arm 60$^a$ which by means of the link 62$^a$ operated by crank arm 66 on the shaft 64 also turns the eccentric 48$^a$ in the bearing block 44, which is mounted in the uprights 51$^a$, similarly to the arrangement at the large end. It will also be seen that the means for raising the bearing vertically is similar to that shown in Figure 7. In Figure 14, the link 56$^a$ is operated by the shaft 52 and by similar toggle link 57$^a$ raises the block 44 as in the instance at the large end of the roll above described.

Figure 12:
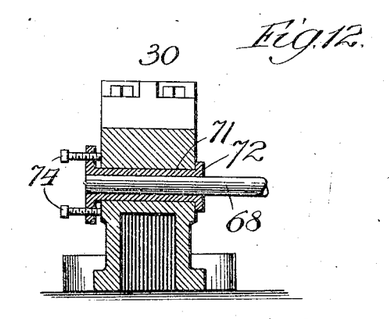
Figure 12 is a detail vertical section of the bearing of shaft 75 shown in Figure 7, taken along the line (12) therein.
Figures 17, 17A, 17B, 18, 19, 20, 21:
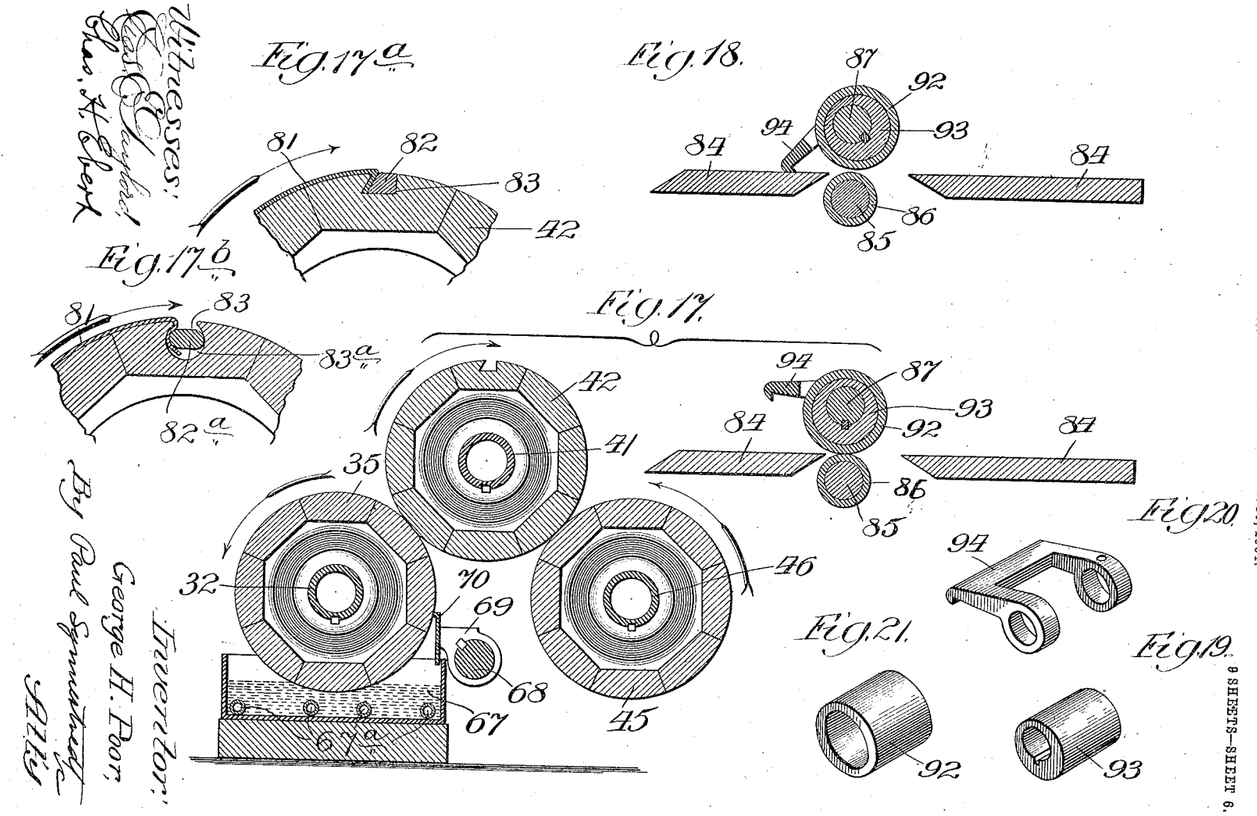
Figure 17 is an enlarged cross section on the line (17) in Figure 1, showing the relative position of the various rolls and the feed table, when the machine is in operation.
Figure 18 is a portion of the same section showing only the feeding rolls and the guide finger for the paper in a different position from that of Figure 17.
Figures 19, 20, and 21, are perspective views respectively of the parts of the feed mechanism shown in Figure 17, removed from the feed shaft.

It will be seen from Figure 2 that the rolls are so disposed as to have the bottom surface horizontal, and from the cross section of Figure 17 it will be observed that under the pasting roll 35 is placed a paste trough 67 carrying steam pipes 67$^a$ whereby the paste or other composition may be kept at a predetermined temperature and thereby of a desired consistency so as to attain uniform results. The said trough is made to conform to the shape of the roll, and at one side thereof is provided a shaft 68 which carries on arms 69 a scraper 70, arranged as shown in Figure 17, to fit the roll 35 as closely as may be desired for cleaning it or to regulate the film of paste. The end of this shaft 68, as shown in Figure 7, is mounted in a bearing 71 having a flange 72, shown by the cross section of Figure 12, and is fastened in the proper place in slot 73 by screws 74, so as to be adjusted to the proper position with respect to the roll.

Figure 22:
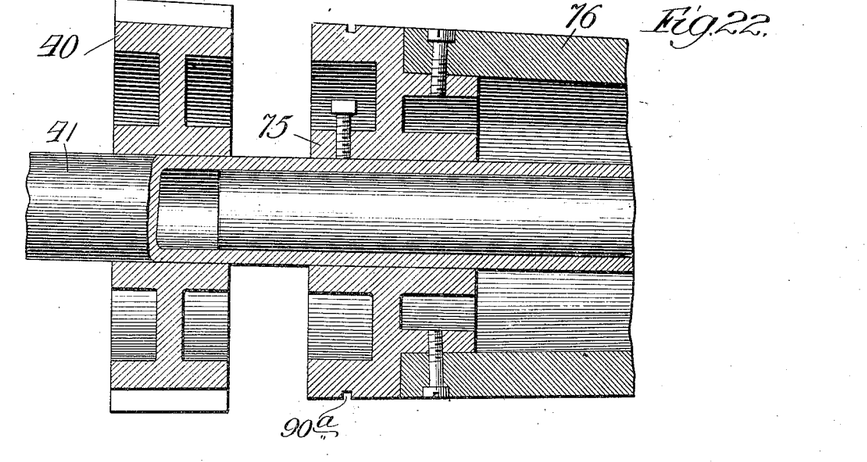
Figures 22 and 23 are partial longitudinal sections taken respectively at the two ends of the winding roll and showing the construction of the same and its mounting upon the shaft.
Figure 23:
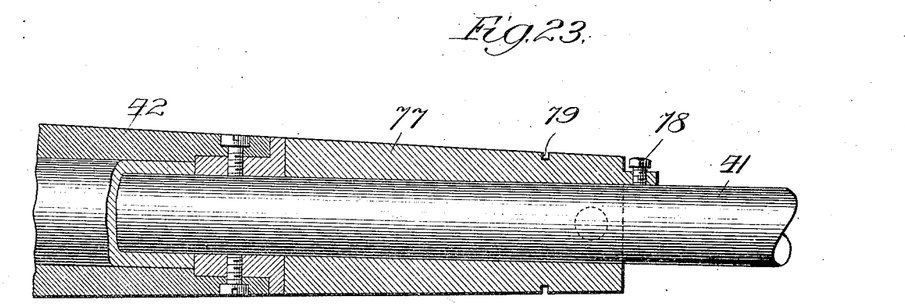
Figure 24:
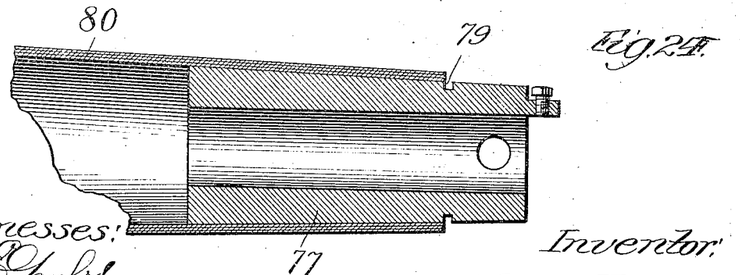
Figure 24 is a longitudinal section of a removable end portion of the winding roll and the finished paper shell wound thereon.

The construction of the rolls may be as indicated by the section of Figure 17 and also in the longitudinal sections of Figures 22 and 23, by which it will be seen that the spiders 75 carry segmental wooden bars 76 upon the shaft 41, and these spiders may be arranged at proper intervals along the shaft. From Figure 23 it will be seen that the extreme end of the winding roller 42 is provided with a removable section 77 which is held temporarily upon the shaft 41 by the set screw 78 and is provided with a groove 79 which operates with the circular cutter hereinafter to be described for trimming the edges of the tube 80, after which the entire loose section 77 carrying with it the finished tube 80 may be drawn off of the winding roll. The paper 81 in starting a shell may be fastened as shown in Figures 17ª, 17ᵇ, by the taper wedge 82 or eccentric bar 82ª in slot 83.

Figure 13:
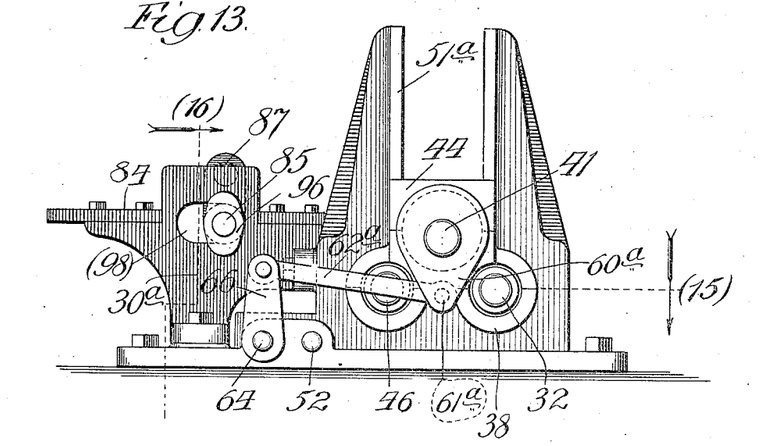
Figure 13 is an end elevation taken from the right-hand of the machine in Figure 1.

From Figures 1, 2, and 17 it will be observed that I have provided a feed table 84 situated as shown in the latter figure, and below the same is a feed shaft 85 having at intervals rollers 86 thereon, above which on the other side of the table is a co-operating roller shaft 87. To drive the feed shaft 85 I provide, (Figures 1 & 9), on the shaft 32 a large sprocket gear 88 which by the chain 89 drives the sprocket 90 on the shaft 85. The idle sprocket wheel 91 is to regulate the tension and hold the chain out of the way. The shaft 85 is turned constantly by the chain 89, and the shaft 87 is non-rotative and carries idle rollers for feeding. It will be seen from Figures 19, 20, and 21, that upon the shaft 87 I have keyed eccentric bearings 93 outside of which are roller rings 92 contained between the two arms of the guides 94 which are made as shown in Figure 20 and straddle the roller rings 92. As appears from Figures 1 and 2, the shaft 87 has keyed upon its end a handle 95 shown at the left of said Figures, by which the shaft may be partly rotated, and it will be seen that when the shaft is turned it carries with it the finger guides 94 which when in lowered position as shown in Figure 18 come in contact with the table and serve to catch and adjust the edges of the paper in proper position, the rotation of cam 93 meanwhile lifting the roll 92; but when the handle 95 is thrown down, the eccentric 93 causes the roller 92 to engage the paper to feed it into the machine, at the same time raising the guide finger 94 to allow of this motion. Referring to Figure 16: in order to properly adjust the relation of the two shafts 85 and 87 I have mounted the former in a bearing 96 which carries an upwardly extending arm 97 carrying the shaft 87, and the relative positions of the two may be changed and also their position with respect to the slot in the table (Figures 7 & 13) adjusted by means of the engagement of the bearing 96 with the slot 98 and the parts held by means of set screws 99 as shown in Figure 16. The adjustment and mountings for the smaller end of the set of rollers is essentially the same as for those above described, for the large end, the corresponding parts being marked with the same numeral and indexed with the letter ª.

Figure 25:
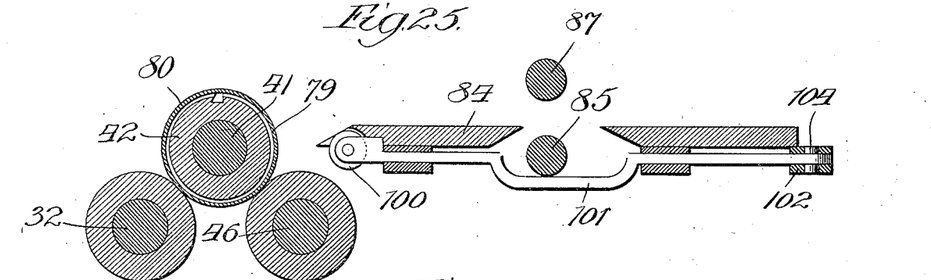
Figure 25 is a vertical cross section through the rolls and the shell and feed table, showing the means for cutting or trimming the ends of the shell, the section being along the line (25) in Figure 1 and also in Figure 26.
Figure 26:
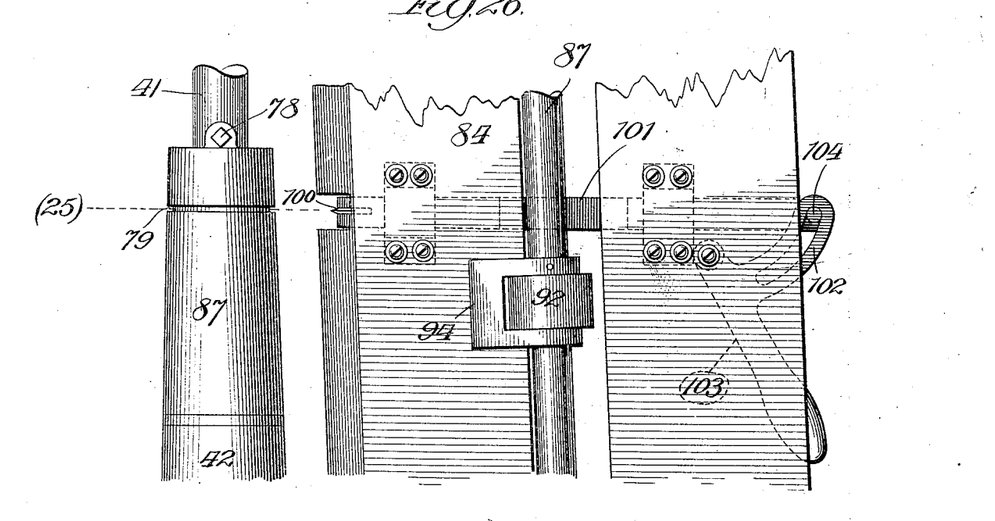
Figure 26 is a fragmental plan view of the feed table and the winding roll, showing the position of the disk knife when out of operation.
Figure 27:
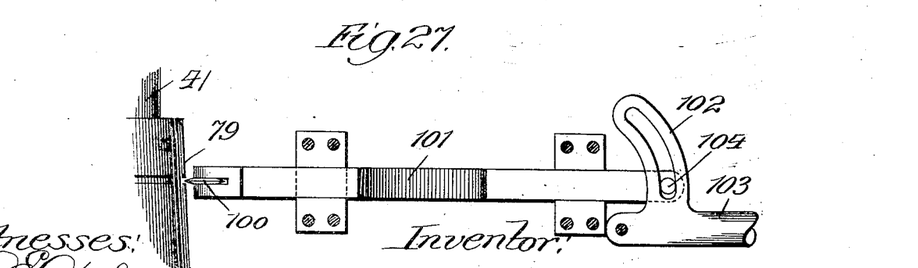
Figure 27 is a plan view of the knife alone and its operating mechanism in operative position.

Referring to Figure 2, and more particularly to Figures 25, 26, and 27, it will be seen that near the ends of the winding roll I provide therein grooves 79 and in order to properly trim the ends of the tube or shell I provide a reciprocating cutter disk 100. From these figures it will be seen that under the table 84 I provide a laterally shifting bar 101 which at its end carries the disk knife 100 and is operated to shove the disk into co-operation with the groove 79 to trim the edges of the shell, by means of the slotted arm 102 of the handle 103 which engages the pin 104 on the end of the bar 101. The position of the knife in operation is shown in Figure 27.

It will be noted that the grooves 79 are at the two ends on the metallic part of the roll, the one on the right being on the removable section 77. In use I provide several of these sections 77, so that when a shell is removed, being engaged and carried on this part, the shell can be hung up to dry before taking out the section 77 and meanwhile a fresh section of the same kind is placed on the shaft to complete the roll for winding the next shell.

To provide for more easy removal of the finished shell from the former I prefer to fasten the paper 81 in the slot 83 as in Figure 17ᵇ. The channel 83ª is circular, and the bar 82ª is elliptical, so that when turned as shown it clamps the paper in the channel, but when turned as indicated in dotted lines it releases its grip, and the shell may be slid off.

Figure 28:
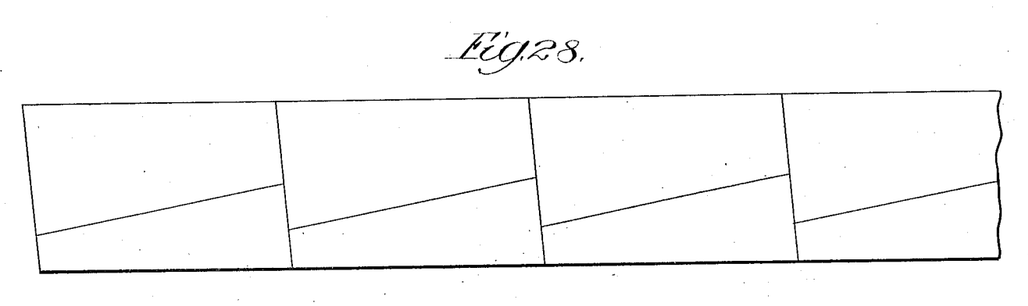
Figure 28 is a diagram illustrating the method of cutting a roll of paper into sheets for use in the machine.
Figure 29:
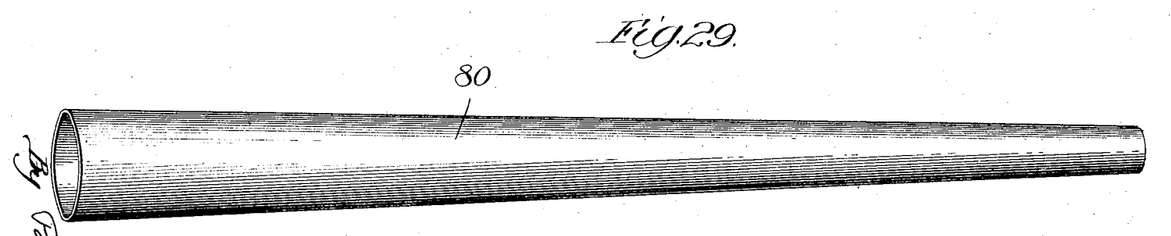
Figure 29 is a perspective view of a complete paper shell made upon the machine.

The machine being constructed and assembled as above described, the operation is as follows: The sheets of paper are cut as indicated as in the diagram of Figure 28 and a quantity of some binding material, as paste or cement, but preferably an asphaltum composition, which serves also for water-proofing, is supplied in the tank 67 as shown in Figure 17, and the scraper 70 is normally adjusted so as to leave a thin film of the fluid upon the roller 35 as it revolves. (The scraper is also adapted for cleaning the roller.) As shown, the shaft 87 is initially turned by means of the handle 95 so as to hold down the finger 94 as in Figure 18, and at the same time it lifts the rollers 92 out of contact with the driving rollers 86. The paper being fed in and adjusted nicely against the fingers 94, a turn of the handle 95 downward will lift the fingers 94 and bring the rollers 92 in contact with the rollers 86, whereupon the paper will be continuously fed into the machine. It will be understood of course that because of the tapered form of the several rolls the paper must travel faster at one end than at the other and the movement under the several rolls 92 will be variant according to the position along the machine. To provide for this the feeding rolls may vary in diameter if desired, but I prefer the construction shown, and of course after the paper has started in the fingers 94 will be lowered again in order to catch and adjust the next sheet on the pile when it is pushed in, and at the same time the rollers 92 are raised off the paper so that the paper may be properly fed. This I regard as an important feature, since it will be clear that the movement of the sheets of paper will vary according to the degree of divergence of the conical rollers and yet the same feeding rolls may be always used. By reference to Figure 17 it will be seen that the paper coming off the table 84 is carried between the presser roll 45 and the winding roll 42, and having been attached to this latter roll in slot 83 at the beginning of the operation, the paper is carried around by the roll 42 and in contact with the roll 35 which spreads an even coat of the asphaltum composition on its surface, and the operation proceeds, it being understood of course that the different sheets of paper are fed in continuously until the desired thickness of the shell is formed.

By reason of the fact that the central roll 42 rests upon the other rolls by its weight, and the ball and socket bearing and lateral adjustability of the roll 45, it will be seen that rolls of varying tapers can be readily used, and the thickness of the tube will be automatically accommodated as the winding proceeds.

The shell having been finished, the winding roll 42 will be elevated in the position shown in Figure 6, whereupon the eccentric bar 17ᵇ is turned to release the paper, and by loosening the set screw 78 the movable section 77 of the winding roll may be drawn off the end of the shaft 41, drawing the entire shell off the former. Previous to this however, it is generally advisable to make use of the knives for truing up the two edges, which is done by shoving the handles 103 inward to place the knives in position as shown in Figure 27 to cut the edges in proper form, by cooperating with the slots in the two ends of the roller. The shell may now be hung up to dry, the section 77 remaining therein till later, and a new section 77 being supplied to complete the former, ready for starting a new shell.

It will be understood of course that the form and proportions of the rollers will be varied to suit the kind of shell or cylinder to be made, and by the various adjustments the amount of binding material in use may be varied by adjusting the scraper 70, and the compactness of the tube may be varied by changing the pressure on the roll 45, all of which movements are effected by shifting the eccentric bearing 48 by means of the lever 65, as heretofore described. It will be understood that these levers may be operated by power when desired, so that the whole machine may be controlled by a single man stationed at one place. The binding material I prefer to use for cementing the layers of paper together is an asphaltum composition, having considerable body, and this has also the advantage of preserving the paper against moisture when in the ground. The scraping knife will at times be pressed close to the "pasting" roller to clean off its surface, as it must be understood that the asphaltum tends to accumulate thereon.

Having thus described my invention and illustrated its use, what I claim as new and desire to secure by Letters Patent, is the following:

1. In a shell winding machine the combination with appropriate rollers for applying paste and pressure to the shell, of a winding roll mounted with one end in a vertically adjustable pivoted bearing, adapted to permit elevation of one end to slide the shell off when completed, substantially as described.

2. In a shell forming machine, the combination with a pasting roll and a pressing roll, of a winding roll resting thereon by gravity and having vertically movable bearings mounted in eccentric sleeves, whereby the roll may be thrown against either of the other two with varying pressure as desired.

3. In a shell winding machine a winding roll mounted in eccentric bearings, one of said bearings being removable from its support and the other of said bearings being pivotally mounted, whereby the roll can be tilted with one end free.

4. In a shell forming machine a winding roll mounted in eccentric bearings at its two ends, means for moving the eccentrics to shift the position of the roll, and means for elevating both bearings, one of said bearings being mounted upon a pivotal support, substantially as and for the purposes described.

5. In a shell forming machine a winding roll mounted in eccentric bearings at its two ends, means for moving the eccentrics to shift the position of the roll, and means for elevating both bearings.

6. In a shell winding machine the combination with a winding roll, of a pasting roll and a pressure roll supporting said winding roll, and mounted each at their respective ends in ball and socket bearings, and guides wherein the sockets of said bearings are laterally movable, said rolls being tapered; substantially as described.

7. In a shell winding machine, a mechanism for raising and lowering the winding roll, consisting in a series of toggle links engaging the bearing of the roll, and mechanism for operating said links to raise the bearings at the two ends together.

8. In a shell winding machine, a winding roll mounted in eccentric bearings, and means for shifting the position of the roll both laterally and vertically by means of said eccentric bearings, consisting in a crank arm attached to the eccentric, and a lever and link mechanism for rotating the eccentric about its axis, substantially as described.

9. In a shell winding machine the combination with two tapering supporting rolls, having adjustable bearings at the two ends, of a tapered winding roll resting upon the supporting rolls by its own weight; and means for supporting the end bearings of the said winding roll at the two ends allowing for a vertical movement, and means for raising the said bearings simultaneously.

10. In a shell winding machine the combination with two stationary rolls, of a winding roll resting between the same and upon them by gravity, means for driving the winding rolls from the driving means of one of the stationary rolls, and an adjustable bearing for throwing the pressure of the winding roll upon either one or both of the supporting rolls differentially, substantially as described.

11. The combination with a set of tapered rolls, of a feeding mechanism comprising a shaft arranged in line with the contact line of the feeding rolls, a series of eccentrics fixed on the shaft, a roller on each eccentric and a justifying finger fixed to the shaft, and a coöperating presser roll engaging the rolls on the eccentrics, whereby the material is justified in line with the rollers, and the fingers released when the eccentrics bring the feeding device into operation on the material.

12. The combination with a set of tapered shell winding rolls, of means for starting the material in the rolls in a predetermined position, and thereafter allowing the material to feed at varying speeds lengthwise of the rolls, comprising a revolving shaft, a stationary shaft having justifying fingers and fixed eccentrics thereon, and loose roller rings on the eccentrics, the parts being so arranged that the eccentrics make contacts of the roller rings on the revolving shafts immediately as the justifying fingers are raised by turning the stationary shaft, substantially as described.

13. In a shell winding machine a pair of tapered supporting rolls having independent horizontally adjustable bearings at each of their ends, and a tapered presser roll resting by gravity on said rolls and having a pivoted bearing, whereby rolls of varying taper may be used with one set of bearings, substantially as described.

14. In a shell forming machine, the combination with a pasting roll and a pressing roll, of a winding roll resting thereon by gravity, vertically movable bearings for said winding roll, and means for laterally shifting said bearings, whereby the winding roll may be caused to rest on the other two rolls with varying pressure.

15. In a shell winding machine a forming roll having a circular slot and an elliptical bar in said slot for clamping the edge of a sheet therein.

16. In a shell forming machine, the combination with two supporting rolls, of a winding roll resting thereon by gravity, and means for shifting the winding roll between the two supporting rolls to apportion its weight between them, whereby the pressure on the rolls is varied.

In testimony whereof I have hereunder signed my name in the presence of the two subscribed witnesses.

GEORGE H. POOR.

Witnesses:
PAUL CARPENTER,
EDWARD C. BURNS.